(12) United States Patent
Camp, Jr. et al.

(10) Patent No.: US 8,098,881 B2
(45) Date of Patent: Jan. 17, 2012

(54) ADVERTISEMENT INSERTION SYSTEMS AND METHODS FOR DIGITAL CAMERAS BASED ON OBJECT RECOGNITION

(75) Inventors: William O. Camp, Jr., Chapel Hill, NC (US); Yojak Harshad Vasa, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 981 days.

(21) Appl. No.: 12/045,821

(22) Filed: Mar. 11, 2008

(65) Prior Publication Data

US 2009/0232354 A1    Sep. 17, 2009

(51) Int. Cl.
*G06K 9/00* (2006.01)
(52) U.S. Cl. ....................................................... 382/100
(58) Field of Classification Search .................. 348/586, 348/589, E5.069; 382/100; 705/14.36, 14.49
See application file for complete search history.

(56) References Cited

U.S. PATENT DOCUMENTS

| | | | |
|---|---|---|---|
| 5,440,615 | A | 8/1995 | Caccuro et al. |
| 6,115,556 | A | 9/2000 | Reddington |
| 6,208,387 | B1 | 3/2001 | Magnusson et al. |
| 7,230,653 | B1 | 6/2007 | Overton et al. |
| 2001/0017671 | A1 | 8/2001 | Pleven et al. |
| 2002/0107737 | A1* | 8/2002 | Kaneko et al. .................. 705/14 |
| 2004/0172325 | A1 | 9/2004 | Blanco et al. |
| 2004/0208476 | A1 | 10/2004 | Manowitz et al. |
| 2005/0018216 | A1 | 1/2005 | Barsness et al. |
| 2005/0088542 | A1 | 4/2005 | Stavely et al. |
| 2005/0137958 | A1* | 6/2005 | Huber et al. .................. 705/37 |
| 2005/0289590 | A1 | 12/2005 | Cheok et al. |
| 2006/0026628 | A1 | 2/2006 | Wan et al. |
| 2006/0040679 | A1* | 2/2006 | Shikano et al. .................. 455/457 |
| 2006/0143078 | A1* | 6/2006 | Pozniansky et al. ............ 705/14 |
| 2007/0300142 | A1 | 12/2007 | King et al. |
| 2008/0147730 | A1* | 6/2008 | Lee et al. .................. 707/104.1 |
| 2008/0189360 | A1* | 8/2008 | Kiley et al. .................. 709/203 |

FOREIGN PATENT DOCUMENTS

| | | |
|---|---|---|
| DE | 2730837 A1 | 8/1996 |
| EP | 1056281 A1 | 11/2000 |
| EP | 1071278 A2 | 1/2001 |
| EP | 1416727 A1 | 5/2004 |
| KR | 2006033296 A * | 4/2006 |
| WO | WO 2007/130688 A2 | 11/2007 |

OTHER PUBLICATIONS

International Preliminary Report on Patentability, PCT Application No. PCT/US08/10953, Jan. 26, 2011.
Supplementary European Search Report corresponding to European Application No. 08873281.3 dated Mar. 4, 2011.
Notification of Transmittal of the International Search Report and the Written Opinion of the International Searching Authority, or the Declaration, International Search Report, and Written Opinion of the International Searching Authority, PCT International Application No. PCT/US2008/10953, Mar. 25, 2009.

* cited by examiner

*Primary Examiner* — Gregory F Cunningham
(74) *Attorney, Agent, or Firm* — Myers Bigel Sibley & Sajovec, P.A.

(57) ABSTRACT

Digital cameras include an image capture system, an object recognition system and an advertisement insertion system. The image capture system captures a visible image as a digital image. The object recognition system recognizes visible objects in the digital image. The advertisement insertion system inserts an advertising-related image into the digital image in response to a visible object in the digital image that was recognized. The user of the digital camera may be compensated for exposure to the advertising-related image.

19 Claims, 9 Drawing Sheets

ADVERTISEMENT INSERTION SYSTEMS AND METHODS FOR DIGITAL CAMERAS BASED ON OBJECT RECOGNITION

FIELD OF THE INVENTION

The present invention relates to electronic devices, and more particularly to digital cameras and operating methods therefor.

BACKGROUND OF THE INVENTION

Traditional cameras use film to capture and store images. Digital cameras, however, take video and/or still photographs digitally, by recording and storing photographic images in digital form. Capture is usually accomplished by use of a photosensor, for example using charge-coupled devices. The stored images can be uploaded to a computer immediately or stored in the camera to be uploaded to a computer and/or printer later. Images may also be archived on a photographic compact disc, an external hard disc and/or online. Digital cameras generally have an LCD and/or other digital display for viewing images in the viewfinder and those in the camera memory.

As used herein, a "digital camera" includes a standalone camera, as well as a digital camera incorporated in other devices including, but not limited to, mobile terminals, music players, video players, Personal Communications Service (PCS) terminals, Personal Digital Assistants (PDAs), laptop computers, notebook computers and/or handheld computers. Moreover, as used herein, the term "mobile terminal" includes a satellite or terrestrial cellular radiotelephone, a PCS terminal that may combine a cellular telephone with data processing, facsimile and/or data communications capabilities, a PDA that can include a radiotelephone, pager, Internet/Internet access Web browser, organizer, calendar and/or Global Positioning System (GPS) system, and/or conventional laptop and/or palmtop computers and/or other appliances that include a wireless transceiver. Digital cameras are often combined with cellular radiotelephones to provide what is commonly referred to as a "camera phone".

SUMMARY OF THE INVENTION

Digital cameras according to some embodiments of the present invention include an image capture system, an object recognition system and an advertisement insertion system. The image capture system is configured to capture a visible image as a digital image. The object recognition system is configured to recognize visible objects in the digital image. The advertisement insertion system is configured to insert an advertising-related image into the digital image in response to a visible object in the digital image that was recognized. Thus, in some embodiments, "augmented reality" images may be provided in a digital camera, based on object recognition.

In other embodiments, a digital camera includes a digital image display. In these embodiments, the image capture system may be configured to capture a visible image as a digital image and to display the digital image on the digital image display. The advertisement insertion system may be configured to insert an advertisement-related image into the digital image that is displayed on the digital image display in response to the visible object in the digital image that was recognized. Thus, in some embodiments, advertisement insertion based on object recognition may be performed while the digital camera is operating in a preview or viewfinder mode.

In other embodiments of the present invention, the digital camera also includes a digital image storage medium. In these embodiments, the image capture system may be configured to store a visible image as a digital image in the digital image storage medium. The advertisement insertion system may be configured to insert an advertising-related image into the digital image that is stored in the digital image storage medium in response to the visible object in the digital image that was recognized. Thus, in some embodiments, advertisement insertion based on object recognition may be performed on the stored digital image.

In still other embodiments, the digital camera includes a digital image upload system that is configured to upload the digital image from the image capture system to external of the digital camera. In these embodiments, the advertisement insertion system may be configured to insert an advertising-related image into the digital image that is uploaded from the image capture system to external of the digital camera, in response to the visible object in the digital image that was recognized. Thus, in some embodiments, advertisement insertion based on object recognition may be used for an uploaded digital image, i.e., a digital image that is uploaded for external storage and/or printing. Uploading may be provided by a wireless communications system, such as a cellular and/or ad hoc short-range wireless communications system that is included in the digital camera.

In still other embodiments of the present invention, the digital camera also includes a position system, such as a GPS system, that is configured to obtain a geographic position and/or direction of the digital camera. In these embodiments, the advertisement insertion system may be configured to insert an advertising-related image into the digital image in response to the visible object in the digital image that was recognized, and in further response to the geographic position/direction of the digital camera that was obtained. Thus, the advertisement that is inserted may also be location dependent.

In yet other embodiments of the present invention, the digital camera may also include a subscriber identification module that identifies a language of a user of a digital camera. In these embodiments, the advertising-related image may include text therein. Moreover, the advertisement-insertion system is configured to insert into the digital image the advertising-related image including the text therein in the language that is identified by the subscriber identification module in response to the visible object in the digital image that is recognized.

In still other embodiments, the digital camera includes a download system that is configured to download into the digital camera from external of the digital camera, indicators of the visible objects to be recognized and advertising-related images corresponding to the visible objects to be recognized. In these embodiments, the object recognition system may be responsive to the indicators of the visible objects to be recognized. Moreover, the advertisement insertion system may be responsive to the advertising-related images corresponding to the visible objects to be recognized. Downloading may be provided by a wireless communications system, such as a cellular and/or ad hoc short-range wireless communications system that is included in the digital camera.

In any of the embodiments described herein, the advertisement insertion system may be configured to insert the advertising-related image into the digital image as an overlay image, as an additional image and/or as a replacement image. Various display, storage and/or printing options may be provided for the digital image that includes the advertising-related image. Moreover, in other embodiments, the advertising-related image may be transitory and/or permanent.

Moreover, in other embodiments of the invention, a financial credit system may be provided that is configured to provide the user of the digital camera financial remuneration in response to the advertisement insertion system inserting the advertising-related image into the digital image. For example, in some embodiments, a digital camera may be used with an online digital image processing system that is configured to store and/or print a digital image external of the digital camera. In some embodiments, the financial credit system may be configured to provide the user of the digital camera financial remuneration from the online digital image processing system. For example, subsidized or free external storage of digital images may be provided in some embodiments. In other embodiments, subsidized or free printing of digital images may be provided. Other rewards also may be provided.

Embodiments of the present invention have been described above in connection with digital cameras. However, analogous methods of operating a digital camera may be provided according to still other embodiments of the present invention.

Digital photography methods according to yet other embodiments of the present invention include compensating a user of a digital camera in exchange for the digital camera inserting an advertising-related image into a digital image that is captured by the digital camera from a visible image in response to a visible object in the digital image that was recognized by the digital camera. The advertising-related image may be inserted during a viewfinding (preview) operation of the digital camera, during a digital image storing operation of the digital camera, during a digital image uploading operation of the digital camera and/or during a digital image printing operation of the digital camera. Analogous digital cameras and online digital image processing systems (commonly referred to as "online photo services") may also be provided according to other embodiments of the invention, to facilitate compensating a user of the digital camera in exchange for the digital camera inserting an advertising-related image into a digital image that is captured by the digital camera from a visible image, in response to a visible object in the digital image that was recognized by the digital camera.

BRIEF DESCRIPTION OF THE DRAWINGS

FIGS. 1A-7A are functional block diagrams of digital cameras according to various embodiments of the present invention.

FIGS. 1B-7B are flowcharts of operations of digital cameras of FIGS. 1A-7A, respectively, according to various embodiments of the present invention.

DETAILED DESCRIPTION

Figure 1A:
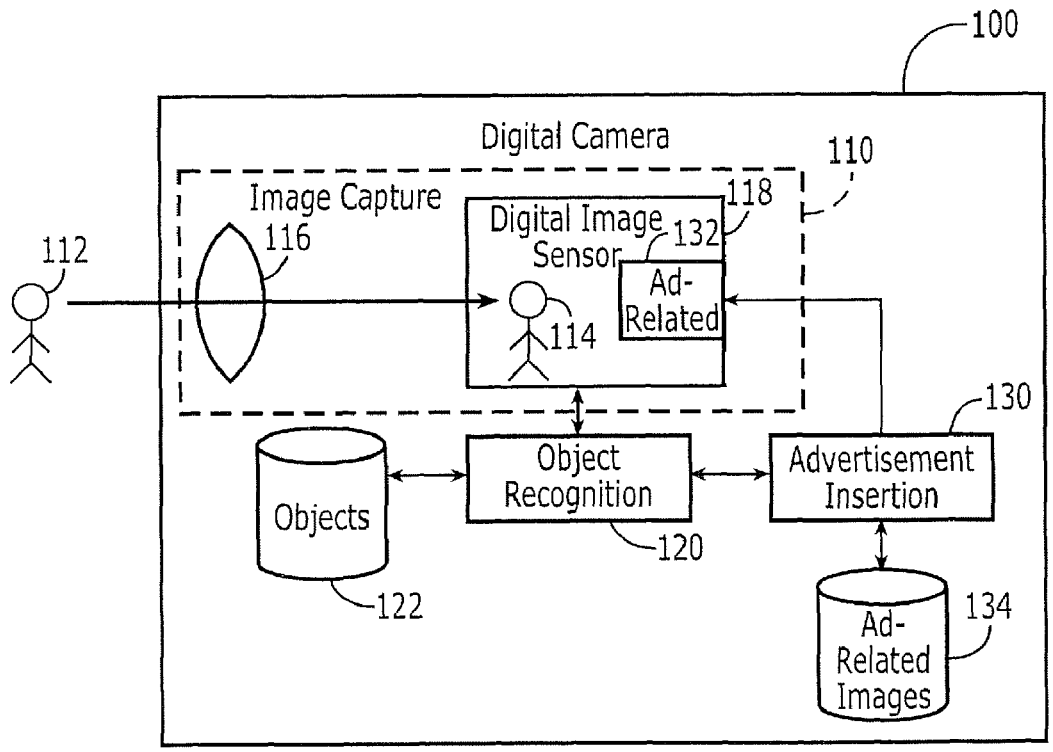

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software; micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1A is a functional block diagram of a digital camera according to some embodiments of the present invention. Referring to FIG. 1A, the digital camera 100 includes an image capture system 110 that is configured to capture a visible image 112 (i.e., a "scene") as a digital image 114, such as a digital picture or frames of digital video. The image may be still and/or moving. The image capture system 110 may include a lens 116 and/or other optical elements, a digital image sensor 118, such as a Charge-Coupled Device (CCD) and/or Complementary Metal Oxide Semiconductor (CMOS) image sensor 118 and/or other components including a display, such as a Liquid Crystal Device (LCD) display and/or a removable storage medium, as will be described in detail below. An object recognition system 120 is configured to recognize visible objects in the digital image 114. The object recognition system may use various object recognition techniques and algorithms to recognize objects, and may operate in connection with a stored objects database 122. As used herein, the term "object" means any tangible and visible entity, such as a person, place or thing that is visible in the visible image that is captured.

Still referring to FIG. 1A, an advertisement insertion system 130 is configured to insert an advertising-related image 132 into the digital image 114, in response to a visible object 112 in the digital image that was recognized. The advertising-related image 132 may be inserted at various locations in the digital image 114, and may be provided as an overlay image, an additional image and/or a replacement image of permanent and/or transitory duration, as will be described in detail below. The advertising-related image(s) may be stored in an advertising-related images database 134. The advertising-related image(s) may also include accompanying sounds (e.g., voice/music).

Some embodiments of the present invention may arise from an unexpected realization that "augmented reality" may be provided for digital images that are captured by a digital camera. More particularly, advertising may be effectively shown in connection with a digital image that is captured, if the advertising relates intelligently to the scene which is being captured. Intelligent advertising may be provided by using object recognition capability, so as to intelligently key off features of the scene that are then used to direct possible images to be substituted/added into the scene for advertising.

Figure 1B:
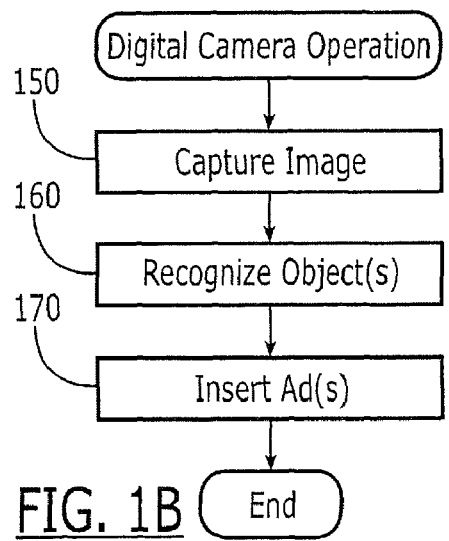

FIG. 1B is a flowchart of operations that may be performed to operate a digital camera, such as the digital camera 100 of FIG. 1A, according to various embodiments of the present invention. As shown in FIG. 1B, at Block 150, a visible image is captured as a digital image, for example by an image capture system 110 of FIG. 1A. Referring to Block 160, visible objects in the digital image are recognized, for example by an object recognition system 120 of FIG. 1A. Finally, at Block 170, advertising-related images are inserted into the digital image in response to the visible object in the digital image that was recognized. The operations of FIG. 1B may take place out of the order shown.

Figure 2A:
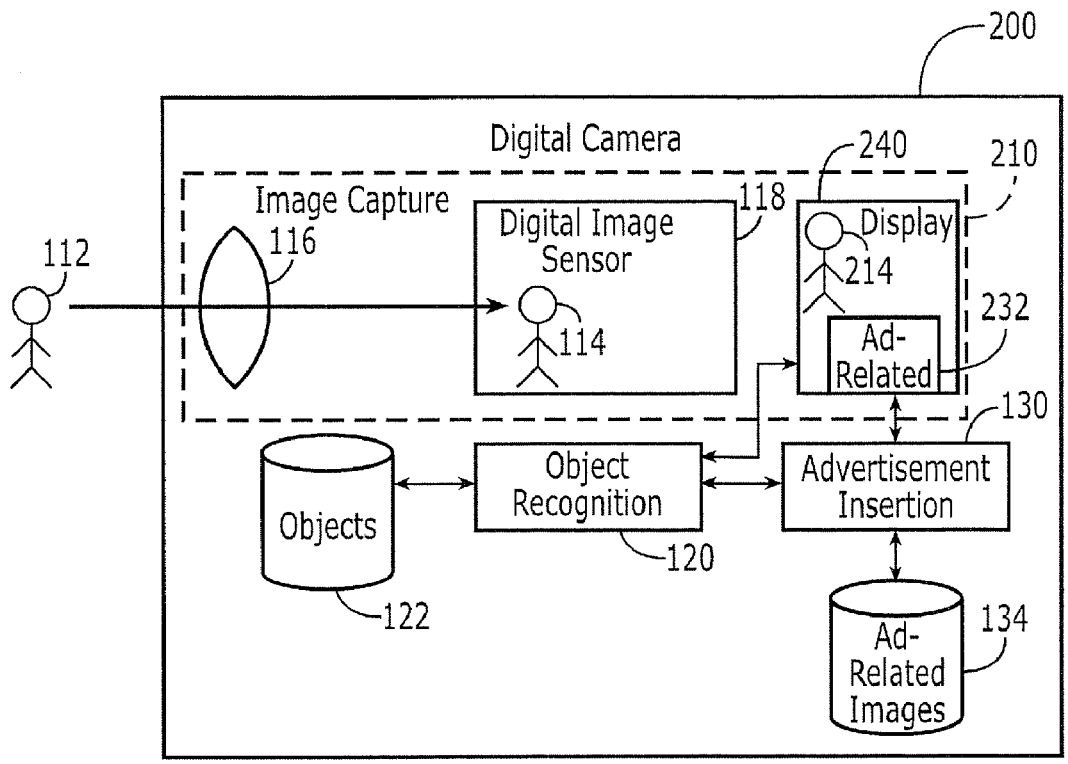

FIG. 2A is a functional block diagram of digital cameras according to other embodiments of the present invention. Referring to FIG. 2A, these digital cameras 200 further include a digital image display 240, such as a LCD display that is commonly used to display visible images during a "preview" or "viewfinder" mode of the digital camera, and/or when reviewing (playing back) previously stored images. The image capture system 210 is configured to capture a visible image 112 as a digital image 114, and to display the digital image 114 on the digital image display 240. The object recognition system 120 is configured to recognize visible objects 112 in the digital image that is captured by the image capture system 210 and/or that is displayed on the digital image display 240. The advertisement insertion system 130 is configured to insert an advertising-related image 232 into the digital image 214 that is displayed on the digital image display 240. Accordingly, object recognition-based advertisement insertion may be performed on the image on the digital image display of the digital camera during a preview (viewfinder) mode and/or during an image review mode.

Figure 2B:
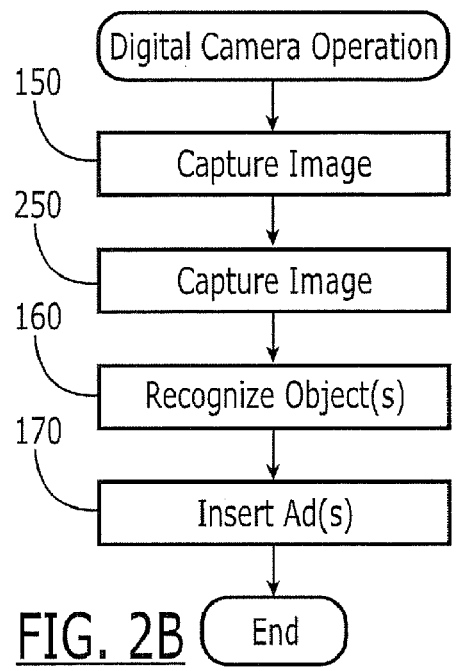

FIG. 2B is a flowchart of operations that may be performed according to embodiments of FIG. 2A. In these embodiments, after an image is captured at Block 150, objects are recognized at Block 160, advertising-related images 232 are inserted at Block 170 and an image is displayed at Block 250, for example on the display 240 of FIG. 2A. The image includes the advertising-related image that was inserted. The operations of FIG. 2B may take place out of the order shown.

Figure 3A:
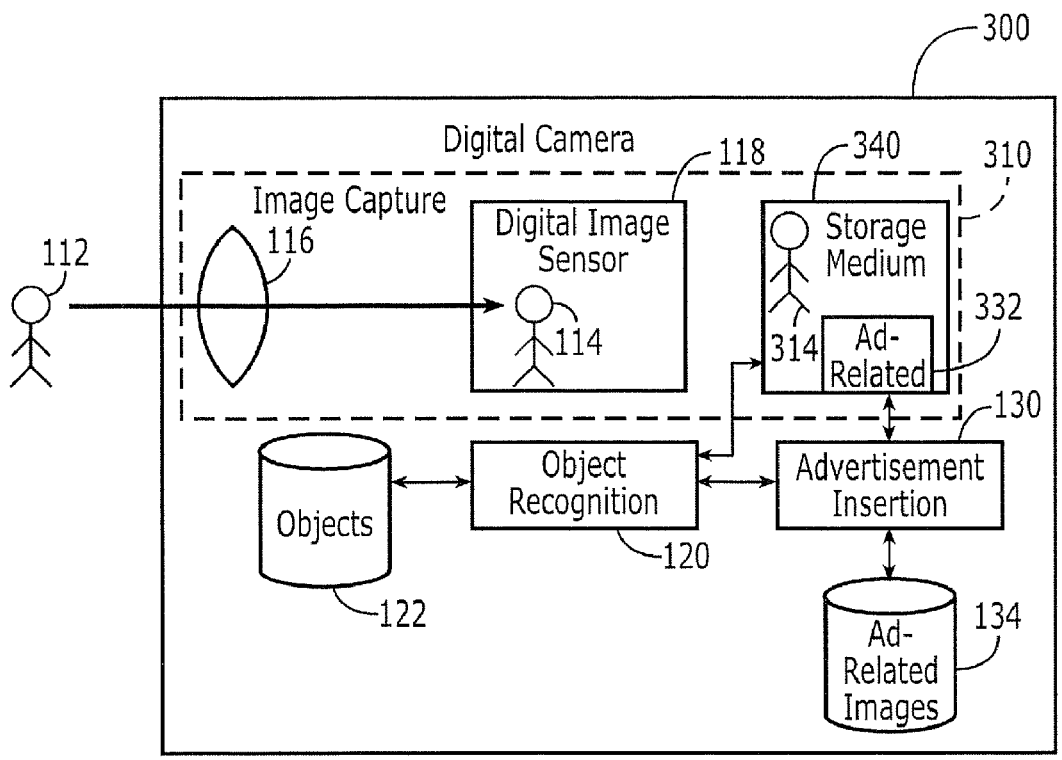

FIG. 3A is a block diagram of digital cameras according to yet other embodiments of the present invention. In these embodiments, the digital camera 300 further includes a digital storage medium, such as a removable digital storage medium 340. The image capture system 310 is configured to store a visible image 112 as a digital image 314 in the digital image storage medium 340. The object recognition system 120 is configured to recognize visible objects in the digital image 314 that is captured by the image capture system 310 and/or is stored in the digital image storage medium 340. The advertisement insertion system 130 is configured to insert an advertising-related image 332 into the digital image 314 that is stored in the digital image storage medium 340 in response to the visible object in the digital image that was recognized.

Figure 3B:
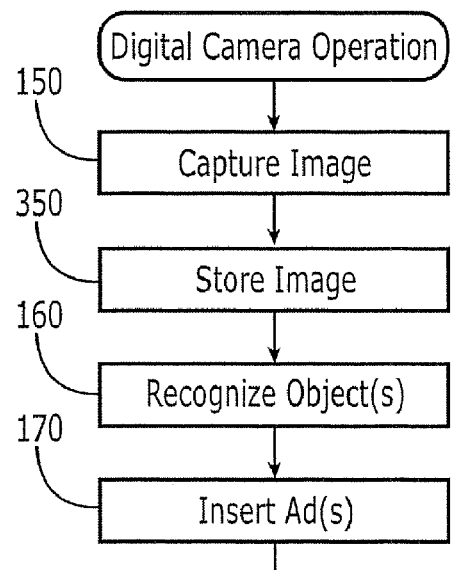

FIG. 3B is a flowchart of digital camera operations that may be performed according to embodiments of FIG. 3A. As shown in FIG. 3B, after capturing an image at Block 150, an image is stored at Block 350, for example in a removable storage medium 340. Object recognition takes place at Block 160 and advertisement insertion takes place at Block 170. The operations of FIG. 3B may take place out of the order shown.

Figure 4A:
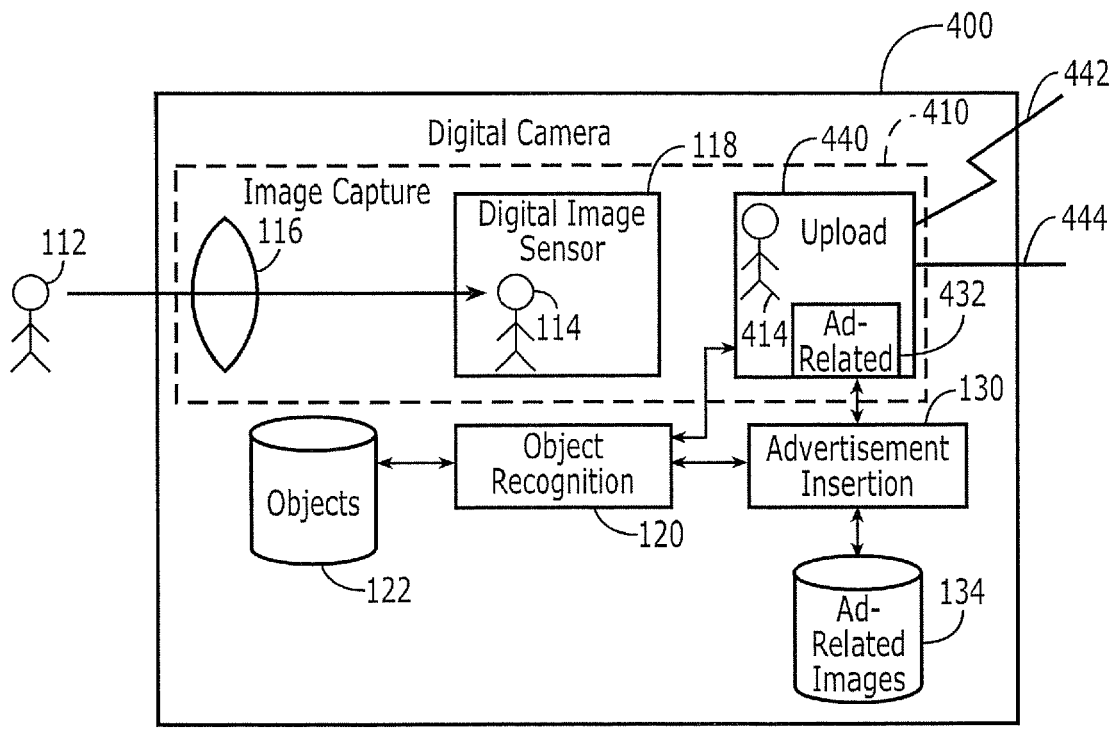

FIG. 4A is a block diagram of digital cameras according to other embodiments of the present invention. Referring to FIG. 4A, a digital camera 400 according to these embodiments further includes a digital upload system 440 that is configured to upload the digital image 414 from the image capture system 410 to external of the digital camera 400 using a wireless link 442 and/or a wired link 444. The wireless link 442 may include cellular and/or ad hoc short-range wireless links, such as Bluetooth and/or Wi-Fi links. The wired link 444 may include a USB connection. The object recognition system 120 may be configured to recognize visible objects in the digital image 414 that is captured by the image capture system 410 and/or that is uploaded from the image capture system 410 to external of the digital camera 400. The advertisement insertion system 130 is configured to insert an advertising-related image 432 into the digital image that is uploaded from the image capture system 410 to external of the digital camera 400 in response to the visible object 112 in the digital image that was recognized.

Figure 4B:
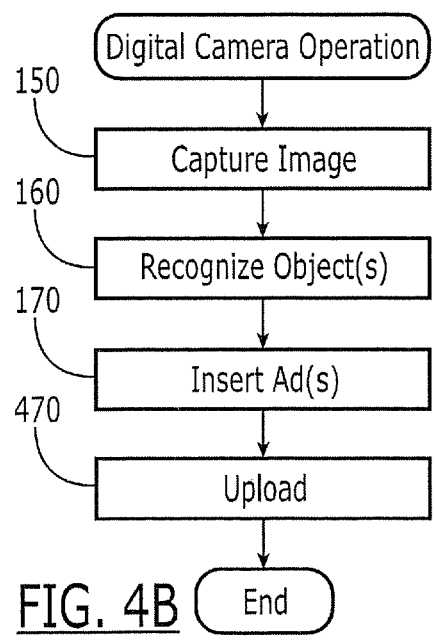

FIG. 4B is a flowchart of analogous digital camera operations that may be performed according to embodiments of FIG. 4A. As shown in FIG. 4B, the image that is captured at Block 150, including the advertising-related images 170, are uploaded at Block 470. The operations of FIG. 4B may take place out of the order shown.

To summarize FIGS. 1A-4B, some embodiments of the present invention can insert an advertising-related image into a digital image in response to a visible object in the digital image that was recognized, as was generally described in FIGS. 1A and 1B. Object recognition and advertisement insertion may take place during a display mode (i.e., a preview/viewfinder mode and/or a review mode), as shown in FIGS. 2A and 2B. Object recognition and advertisement insertion may take place during image storage mode, as illustrated in FIGS. 3A and 3B. Object recognition and advertisement insertion may take place during upload, as illustrated in FIGS. 4A and 4B. Various combinations and subcombinations of object recognition and advertisement insertion may be provided during display mode, during storage mode and during upload, according to other embodiments of the present invention. Thus, for example, object recognition and advertisement insertion may take place during display and storage modes, during display and upload modes, during storage and upload modes, or during display, storage and upload modes.

Figure 5A:
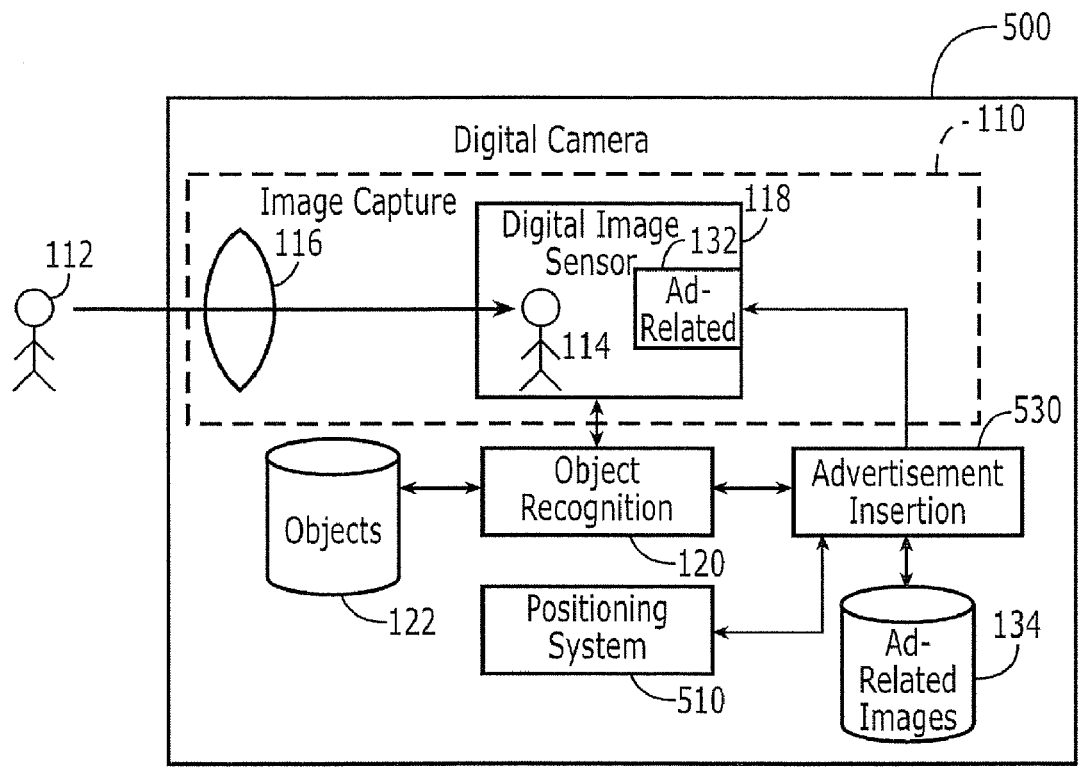

FIG. 5A is a functional block diagram of a digital camera according to still other embodiments of the present invention. As shown in FIG. 5A, a digital camera 500 includes a positioning system 510, such as a GPS system, that is configured to obtain the geographic position of the digital camera 500. In these embodiments, the advertisement insertion system 530 is configured to insert an advertising-related image 132 into the digital image 114 in response to the visible object 112 in the digital image 114 that was recognized, and in further response to the geographic position of the digital camera 500 that was obtained, for example, by the position system 510. Thus, in these embodiments, the specific advertising-related image that is inserted can depend both on the object 112 that is recognized and the location or position of the digital camera 500. For example, if an advertisement for a restaurant is to be inserted in response to recognition of a restaurant in the image, an advertisement for the particular restaurant that is in the captured image and/or a restaurant that is geographically proximate to the camera, may be inserted. Embodiments of FIG. 5A may be combined with embodiments of FIG. 4A to provide uploading of geographic position coordinates to a networked server, which responds by downloading associated advertisement(s) to the camera.

The positioning system 510 may also include a compass direction or orientation system in other embodiments of the invention. The compass direction/orientation system may comprise a magnetometer device that can provide data as to a direction to which the camera is pointing. Direction information may also be used in selecting/obtaining an appropriate advertising-related image.

Figure 5B:
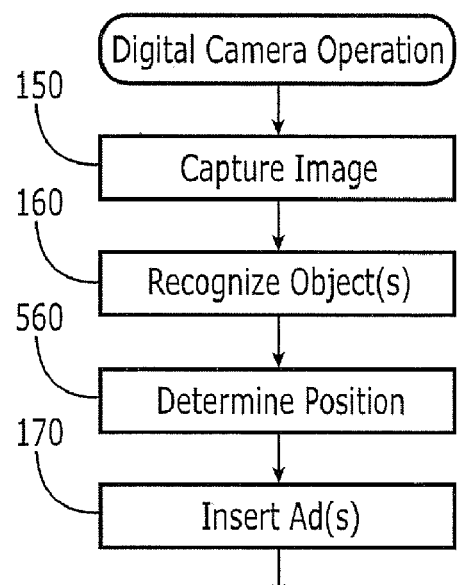

FIG. 5B is a flowchart of operations that may be provided according to embodiments of FIG. 5A. As shown in FIG. 5B, Block 560, the position of the digital camera 500 is determined, for example using the position system 510. The advertising-related image that is inserted at Block 170 is a function of the object(s) that were recognized at Block 160 and the position of the camera 500 that was determined at Block 560. It will also be understood that embodiments of FIGS. 5A/5B may be used in combination with any or all of the other embodiments that are described herein, and that the operations of FIG. 5B may take place out of the order shown.

Figure 6A:
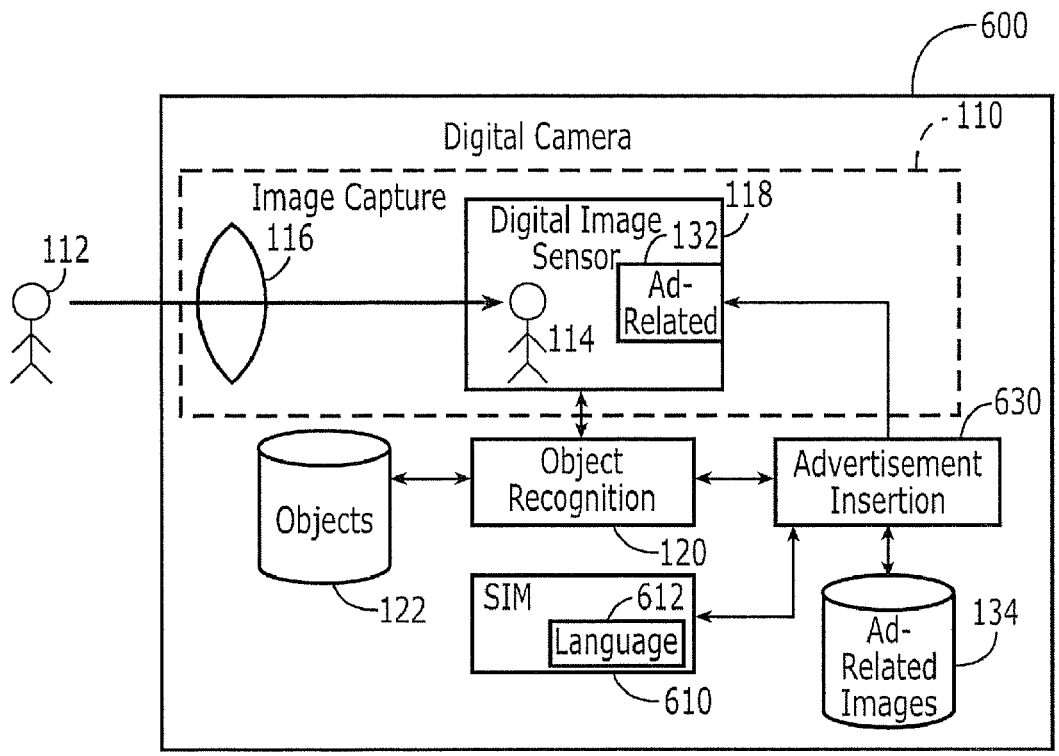

FIG. 6A is a functional block diagram of a digital camera according to still other embodiments of the present invention. As shown in FIG. 6A, this digital camera 600 includes a Subscriber Identification Module (SIM) 610 that is commonly employed, for example with mobile terminals such as camera phones. The SIM device 610, which generally is removable, may include many identification parameters of the subscriber of the mobile terminal, and may include a language indicator 612 that identifies the language to be used, for example for displays on the mobile terminal. In embodiments of FIG. 6A, the advertising-related image 132 includes text therein, and the advertisement insertion system 630 is configured to insert into the digital image 114 the advertising-related image including the text therein in the language 612 that is identified by the subscriber identification module 610 in response to the visible object in the digital image that was recognized. Thus, regardless of the geographic location of the phone and the type advertising-related information being inserted, the advertising-related information 132 (text and/or audible) can appear in the digital camera user's native language.

Figure 6B:
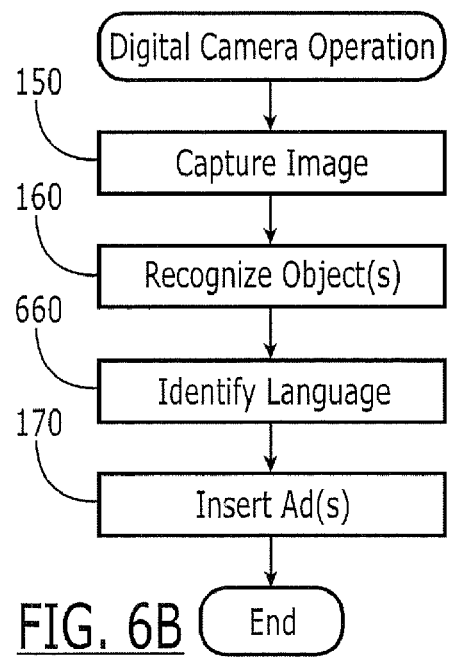

FIG. 6B is a flowchart of digital camera operation methods that can be provided according to embodiments of FIG. 6A. As shown in FIG. 6B, a language is identified at Block 660 and the advertising-related information is inserted at Block 170 based on the objects that were recognized at Block 160 and the language that was identified at Block 660. It will be understood that embodiments of FIGS. 6A and 6B may be used in combination with any or all of the embodiments described herein and that the operations of FIG. 6B may take place out of the order shown.

Figure 7A:
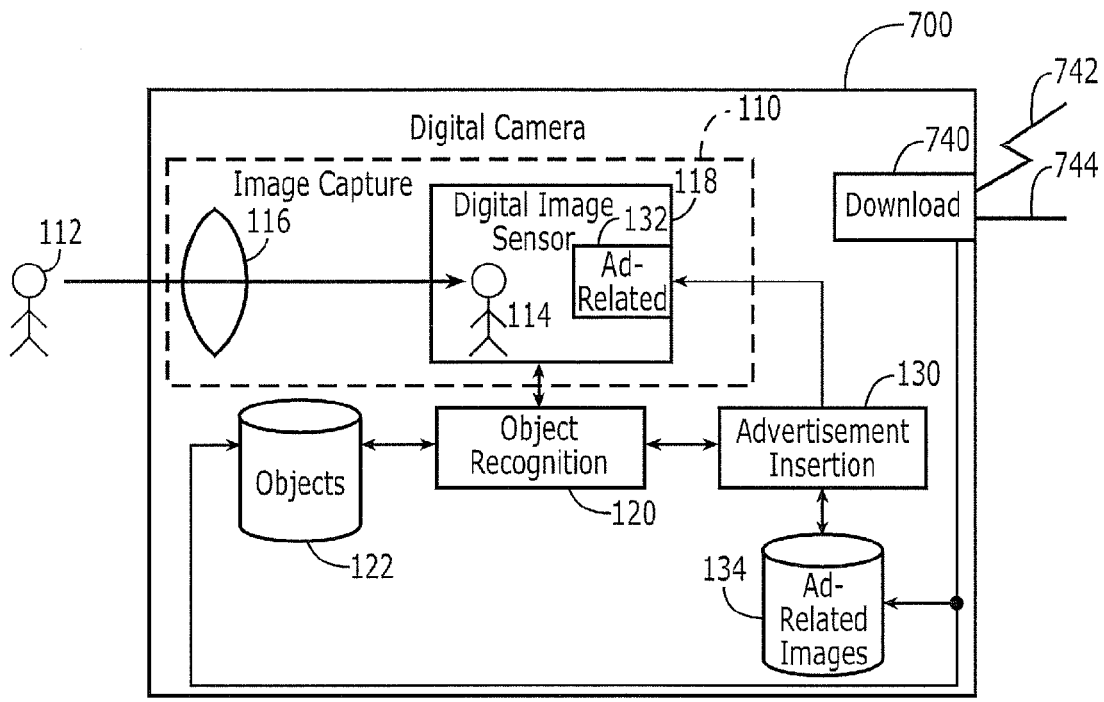

FIG. 7A is a functional block diagram of a digital camera according to yet other embodiments of the present invention. Referring to FIG. 7A, a digital camera 700 according to these embodiments also includes a download system 740 that is configured to download into the digital camera 700 from external of the digital camera 700, indicators of visible objects to be recognized for storage in the object database 122, and advertising-related images corresponding to the visible objects to be recognized for storage in the advertising-related images database 134. Downloading may take place using a wireless link 742, such as a cellular and/or ad hoc short-range wireless link (e.g., Bluetooth and/or Wi-Fi) and/or using a wired link 744, such as a USB connection. Download by physical media also may be performed.

Figure 7B:
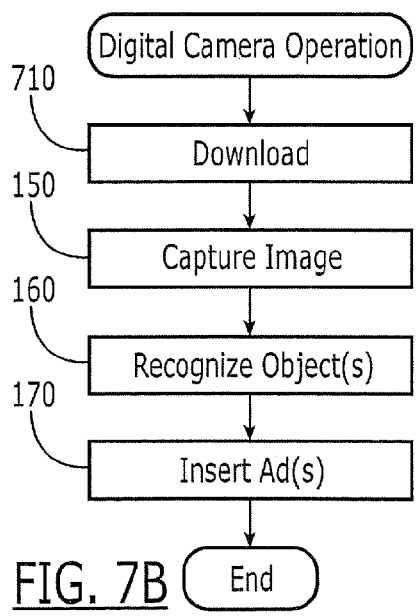

FIG. 7B is a flowchart of digital camera operations that may be performed according to embodiments of FIG. 7A. As shown in FIG. 7B, downloading takes place at Block 710. Downloading may take place prior to and/or during image capture (Block 150), object recognition (Block 160) and/or advertisement insertion (Block 170). It will be understood that embodiments of FIGS. 7A and 7B may be used in combination with any or all of the embodiments described herein and that the operations of FIG. 7B may take place out of the order shown. For example, embodiments of FIGS. 4A, 5A, 6A and 7A may be combined to allow geographic position data and a language indicator to be uploaded, for example to a networked server, which then downloads appropriate advertisement(s) in the appropriate language.

Figure 8A:
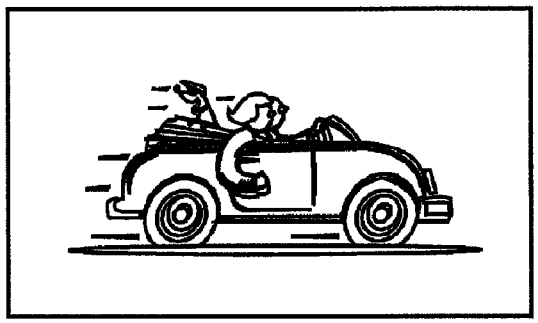
FIGS. 8A-8D are photographs of images that illustrate object recognition-based insertion according to various embodiments of the present invention.

FIGS. 8A-8D illustrate advertising insertion based on object recognition according to various embodiments of the present invention. In particular, FIG. 8A illustrates an example of a visible image (scene) that is captured as a digital image by a digital camera according to any of the embodiments of the invention described herein. As shown in FIG. 8A, the digital image includes people standing next to a car.

Figure 8B:
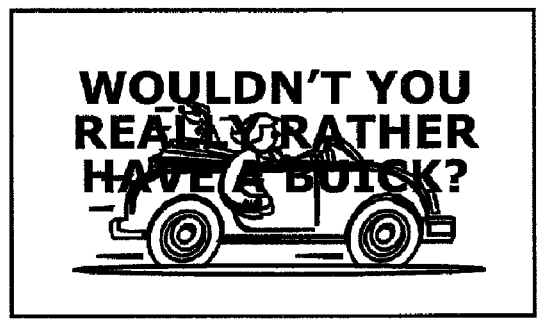
Figure 8C:
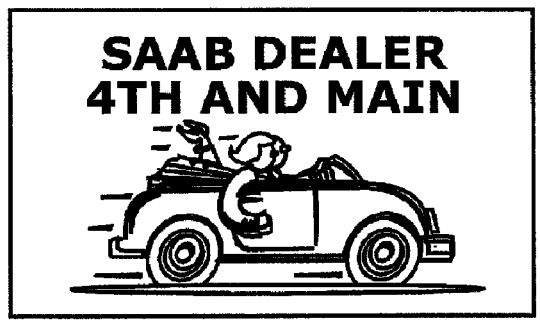
Figure 8D:
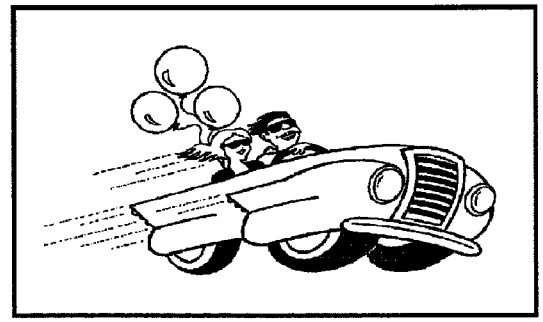

The object recognition system/operation 120/160 recognizes the car (e.g., recognizes a car or recognizes the specific make/model of the car) and, in response, the advertisement insertion/system operation 130/170 inserts into the digital image of FIG. 8A an advertising-related image in response to the car that was recognized. In FIG. 8B, the advertising-related message, "Wouldn't you really rather have a Buick?", is inserted as an overlay on the image. In FIG. 8C, the advertising-related image, "Saab dealer 4th and Main", is inserted as an additional image, wherein at least a portion of the captured image is blocked. Finally, in FIG. 8D, a substitute or replacement of a different car is provided instead of the car that was originally part of the visible image. Thus, one or more advertising-related images may be inserted into the digital image as an overlay image (FIG. 8B), an additional image (FIG. 8C) or a replacement image (FIG. 8D), in response to a visible object in the digital image that was recognized. The advertising-related image may be inserted into the preview or viewfinder image, into the displayed image, into the stored image and/or into the uploaded image of the digital camera, as was already described. Moreover, the image may be a permanent image or a transitory image. The transitory image may also be of varying duration, ranging from very short duration (a "subliminal" image) to a longer duration. The advertising-related image may also be a series of images, such as a series of cars or a moving image, such as a morphing of the captured car into the advertised car. Accompanying audio may be provided. Various attributes of the car, such as its color, make/model, etc. may also be taken into account in selecting the advertising-related image to be inserted.

Figure 9:
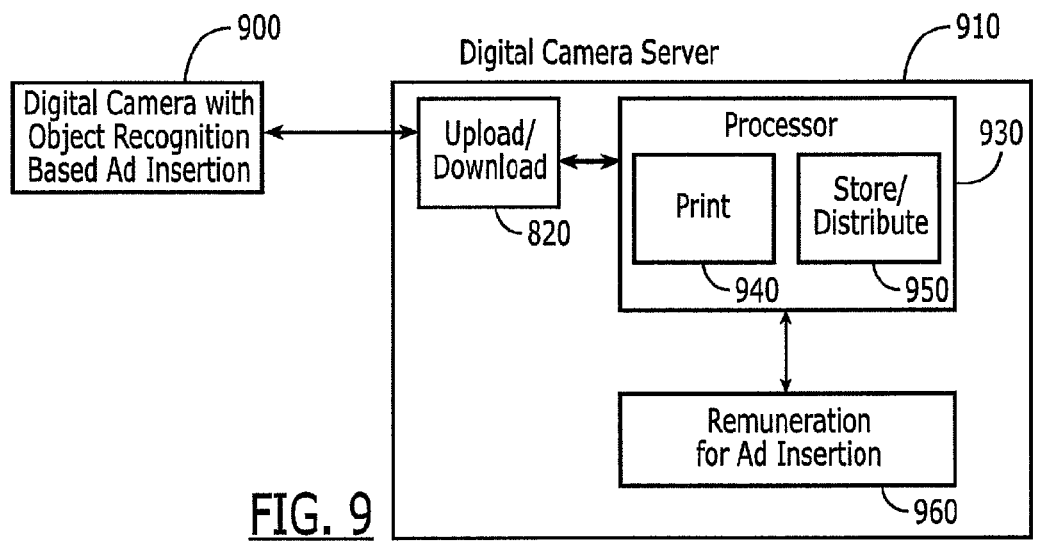
FIG. 9 is a block diagram of a digital camera and an online digital image processing system according to various embodiments of the present invention.

FIG. 9 is a block diagram of a digital camera 900 according to various embodiments of the present invention that communicates with an online digital image processing system 910, according to various embodiments of the present invention, to provide remuneration for advertisement insertion. In particular, the digital camera 900 may comprise any of the embodiments of digital cameras described herein. The online digital image processing system 910 is configured to communicate with the digital camera 900, directly or indirectly via link 912. Link 912 can include a wired link, such as a USB connection, a wireless link, such as a cellular and/or short-range ad hoc wireless link, and/or transfer of a physical storage medium. The online digital image processing system 910 may include a photograph processor 930 that is configured to provide hard copy prints 940 of digital photographs and/or to provide online storage/distribution 950 of digital photographs. Many commercial online digital image processing systems, such as Snapfish, provide online photo services such as print services, as well as online storage/distribution services. Moreover, kiosks have become ubiquitous in drugstores, convenience stores and/or other venues, to provide print/storage/distribution services for digital photographs.

According to various embodiments of the present invention, an online digital image processing system 910 also includes an upload/download system 920 that accepts the digital photographs as uploads, and may provide downloads to the digital camera 900 of objects to be recognized and placed in the object database of the digital camera and advertising-related images to be inserted and placed in the advertising-related images database of the digital camera. The upload/download system 920 may also upload data on the number and/or identity of advertising-related images that were inserted, and may also upload digital images with the advertising-related images inserted therein. A financial credit system 960 may provide a user of the digital camera 900 financial remuneration in response to the advertisement insertion system inserting an advertising-related image into the digital image.

In still other embodiments, object recognition and/or advertisement insertion may take place by the online digital image processing system 910 instead of/in addition to by the digital camera 900. Moreover, camera position data may be uploaded to the online digital image processing system 910 according to, for example, embodiments of FIGS. 5A/5B. The camera position data may be used by the online digital image processing system 910 during advertisement insertion as was described, for example, in connection with FIGS. 5A/5B.

Accordingly, the printing, storage and/or distribution of the digital photographs, with or without the advertising-related images inserted therein, may be subsidized, in whole or in part, by virtue of the user of the digital camera having been exposed to the advertising-related images during the display (preview/viewfinder/review) operation of the camera, during the storage of the digital images and/or during the uploading of the digital images for external printing, storage and/or distribution. It will be understood that the financial credit system 960 may be provided as part of an online digital image processing system 910 or as a separate and distinct service therefrom. Moreover, the online digital image processing system 910 and the financial credit system 960 may be embodied using a central server, separate central servers and/or one or more distributed systems that are interconnected by a network, such as the Internet. Accordingly, remuneration may be provided by and in conjunction with an online digital image processing system and/or independent thereof. For example, remuneration may be given as frequent flyer points, gift cards and/or other forms of remuneration that are independent of the digital image processing system 910.

Figure 10:
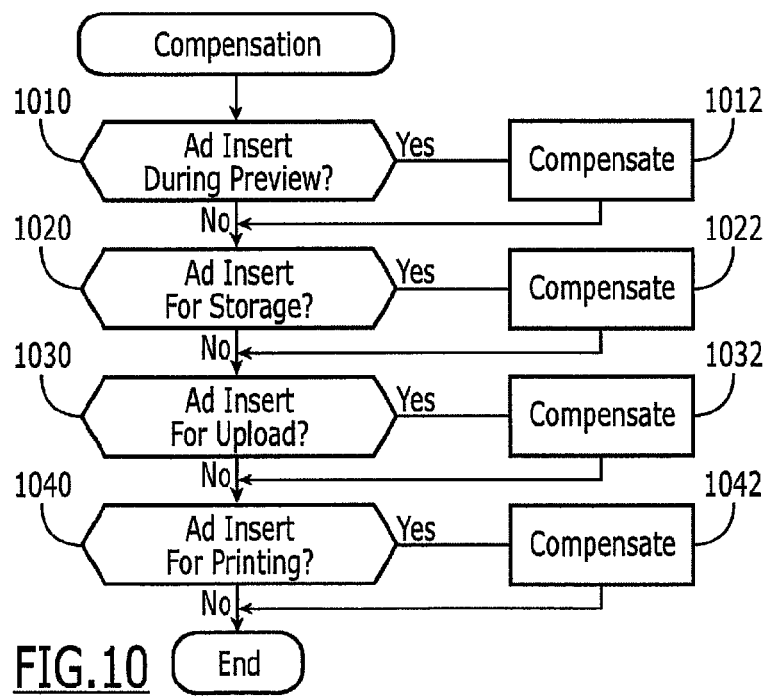
FIG. 10 is a flowchart of operations that may be performed to compensate a digital camera user according to various embodiments of the present invention.

FIG. 10 is a flowchart of various operations that may be performed to compensate a user of a digital camera in exchange for the digital camera inserting an advertising-related image into a digital image that is captured by the digital camera from a visible image in response to a visible object in the digital image that was recognized by the digital camera, according to various embodiments of the present invention. Compensation may be performed, for example, using embodiments of FIG. 9.

Referring to FIG. 10, at Block 1010, a determination is made as to whether advertisement insertion was provided during a preview, viewfinding, review or other display operation of the digital camera. If so, compensation to the user of the camera is provided at Block 1012. At Block 1020, a determination is made as to whether advertisement insertion was performed for the images that are stored in the storage medium of the camera. If so, compensation is provided at Block 1022. At Block 1030, a determination is made as to whether advertisement insertion took place (at the camera and/or at the online digital image processing system) for images that were uploaded and, if so, compensation is provided at Block 1032. At Block 1040, a determination is made as to whether advertisement insertion was provided (at the camera and/or at the online digital image processing system) for prints that were made of the images and, if so, compensation is provided at Block 1042. The various forms of compensation of Blocks 1012, 1022, 1032, 1042 may be the same or different in kind and/or in magnitude. For example, advertisements inserted on the display (Block 1010) may result in the customer being provided with a discount coupon at Block 1012. Compensation (Block 1022) for advertisement insertion in storage may result in the user being provided with free prints or a discount on prints. Compensation (Block 1032) for uploading (Block 1030) may provide for free or subsidized distribution of photographs and compensation at Block 1042 may provide for subsidized or no cost printing of photographs (Block 1040).

Additional discussion of various embodiments of the present invention will now be provided. Some embodiments of the present invention can provide augmented reality of photographs by inserting advertising-related images into digital images based on object recognition. For example, camera phones often scan many images before a picture is taken (viewfinder or preview mode). During that time, advertisements can be effectively shown on the display if they are related intelligently to the scene (i.e., the digital image that is captured). Advertisements may also be effectively shown after the fact when the images are being reviewed (displayed), distributed and/or printed. The digital camera may be provided with object recognition capability, and this object recognition capability may be used to intelligently key off features of the scene, that are then used to direct possible images to be provided into the scene for advertising, either by overlay, addition and/or replacement images.

Thus, for example, when the digital camera is in viewfinder mode and panning a scene for a good shot angle, the camera can be continuously running recognition algorithms to detect objects in the scene. These objects can then be used to select possible images of advertisements to be inserted (either momentarily or permanently) into the scene being viewed. The recorded image can even include the advertising-related image, if desired. The images that augment the scene can be from a local information source and/or received from a central server that receives a formatted request with output from the object recognition system.

For example, as the camera is panned across the scene and a generic car is detected in the image by the object recognition system, the advertisement insertion system can determine that this is a good opportunity to insert an appropriately scaled image of a new model year Toyota into the image where the generic car appears. This can either be momentary or permanent in both the viewed image and the stored/printed image. Business opportunities may also be provided for the advertiser to pay for prints of the image if the inserted image (for example the car) is left in the image to be printed. This can be determined by the printing facility using a watermarking process that detects the inserted image. The advertiser can be billed for the print. Remuneration may also be provided for advertisement insertion during preview, display, storage and/or distribution of the image, as well.

Other objects can be recognized and other advertising-related images can be substituted according to any generic criteria, triggered by any recognition event in the image as it is panned, recorded, uploaded and/or printed.

Another criteria can be the location/direction of the digital camera as the scene is being panned. This can make the advertising even more useful, as it can be related to the user's current location. Thus, motivational advertising and/or subliminal advertising may be provided where the image only appears momentarily. The advertisement may be pushed to the digital camera via Wi-Fi and/or other ad hoc connections, and the product may appear in the image as the scene is being panned by the camera. Thus, the digital camera may act as a "billboard", wherein the display, storage medium and/or prints act as billboard space.

A user of the digital camera may be highly motivated to accept exposure to the object recognition-based advertisements for at least two reasons. First, exposure to the advertisements may provide subsidization or remuneration for the cost of distributing and/or printing the images. Second, the advertising may produce useful information as a digital camera is often used away from home, where the user may desire useful information concerning images being captured by the digital camera. For example, in a foreign location, a user may pan/photograph a restaurant and may wish to be exposed to information concerning the actual name of the restaurant, the location of other nearby restaurants, types of food, prices, etc. Thus, the directed advertising can provide useful information, particularly in the context in which a digital camera is often used.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A digital camera comprising:
   an image capture system in the digital camera that is configured to capture a visible image as a digital image;
   an object recognition system in the digital camera that is configured to recognize visible objects in the digital image;
   an advertisement insertion system in the digital camera that is configured to insert an advertising-related image into the digital image in response to a visible object in the digital image that was recognized; and
   a financial credit system that is configured to provide a user of the digital camera financial remuneration in response to the advertisement insertion system inserting the advertising-related image into the digital image.

2. A digital camera according to claim 1 further comprising a digital image display,
   wherein the image capture system is configured to capture a visible image as a digital image and to display the digital image on the digital image display; and
   wherein the advertisement insertion system is configured to insert an advertising-related image into the digital image that is displayed on the digital image display in response to the visible object in the digital image that was recognized.

3. A digital camera according to claim 1 further comprising a digital image storage medium, wherein the image capture system is configured to store a visible image as a digital image in the digital image storage medium; and wherein the advertisement insertion system is configured to insert an advertising-related image into the digital image that is that is stored in the digital image storage medium in response to the visible object in the digital image that was recognized.

4. A digital camera according to claim 1 further comprising a digital image upload system that is configured to upload the digital image from the image capture system to external of the digital camera, wherein the advertisement insertion system is configured to insert an advertising-related image into the digital image that is uploaded from the image capture system to external of the digital camera in response to the visible object in the digital image that was recognized.

5. A digital camera according to claim 1 further comprising a position system that is configured to obtain a geographic position and/or direction of the digital camera, wherein the advertisement insertion system is configured to insert an advertising-related image into the digital image in response to the visible object in the digital image that was recognized and in further response to the geographic position/direction of the digital camera that was obtained.

6. A digital camera according to claim 1 further comprising a subscriber identification module that identifies a language of a user of the digital camera, wherein the advertising-related image includes text therein; and wherein the advertisement insertion system is configured to insert into the digital image the advertising-related image including the text therein in the language that is identified by the subscriber identification module in response to the visible object in the digital image that was recognized.

7. A digital camera according to claim 1 further comprising a download system that is configured to download into the digital camera from external of the digital camera, indicators of visible objects to be recognized and advertising-related images corresponding to the visible objects to be recognized, wherein the object recognition system is responsive to the indicators of the visible objects to be recognized; and wherein the advertisement insertion system is responsive to the advertising-related images corresponding to the visible objects to be recognized.

8. A digital camera according to claim 1 wherein the advertisement insertion system is configured to insert the advertising-related image into the digital image as an overlay image, an additional image and/or a replacement image, in response to the visible object in the digital image that was recognized.

9. A digital camera according to Claim 1 in further combination with an online digital image processing system that is configured to store and/or print the digital image external of the digital camera, and wherein the financial credit system is configured to provide the user of the digital camera financial remuneration from the online digital image processing system.

10. A digital camera according to claim 1 wherein the advertisement insertion system is configured to insert a transitory and/or permanent advertising-related image into the digital image in response to the visible object in the digital image that was recognized.

11. A digital camera according to claim 4 further comprising a wireless communications system, wherein the digital image upload system is configured to upload the digital image from the image capture system via the wireless communications system.

12. A digital camera according to claim 7 further comprising a wireless communications system, wherein the download system is configured to download into the digital camera via the wireless communications system, the indicators of visible objects to be recognized and the advertising-related images corresponding to the visible objects to be recognized.

13. A digital camera according to claim 11 wherein the wireless communications system comprises a cellular communications system and/or an ad hoc short-range wireless communications system.

14. A digital camera according to claim 12 wherein the wireless communications system comprises a cellular communications system and/or an ad hoc short-range wireless communications system.

15. A digital photography method comprising:

compensating a user of a digital camera in exchange for the digital camera inserting an advertising-related image into a digital image that is captured by the digital camera from a visible image in response to a visible object in the digital image that was recognized by the digital camera.

16. A method according to claim 15 wherein compensating comprises compensating a user of a digital camera in exchange for the digital camera inserting, during a displaying operation of the digital camera, an advertising-related image into a digital image that is captured by the digital camera from a visible image.

17. A method according to claim 15 wherein compensating comprises compensating a user of a digital camera in exchange for the digital camera inserting, during a digital image storing operation of the digital camera, an advertising-related image into a digital image that is captured by the digital camera from a visible image.

18. A method according to claim 15 wherein compensating comprises compensating a user of a digital camera in exchange for the digital camera inserting, during a digital image uploading operation of the digital camera, an advertising-related image into a digital image that is captured by the digital camera from a visible image.

19. A method according to claim 15 wherein compensating comprises compensating a user of a digital camera in exchange for the digital camera inserting, during a digital image printing operation of the digital camera, an advertising-related image into a digital image that is captured by the digital camera from a visible image.

* * * * *

UNITED STATES PATENT AND TRADEMARK OFFICE
CERTIFICATE OF CORRECTION

| | | |
|---|---|---|
| PATENT NO. | : 8,098,881 B2 | Page 1 of 1 |
| APPLICATION NO. | : 12/045821 | |
| DATED | : January 17, 2012 | |
| INVENTOR(S) | : Camp, Jr. et al. | |

It is certified that error appears in the above-identified patent and that said Letters Patent is hereby corrected as shown below:

In the Claims:
Column 13, Claim 3, Line 6: Please correct "image that is that is stored"
to read -- image that is stored --

Signed and Sealed this
First Day of May, 2012

David J. Kappos
*Director of the United States Patent and Trademark Office*